United States Patent
Thibadeau

(10) Patent No.: US 8,886,958 B2
(45) Date of Patent: Nov. 11, 2014

(54) SYSTEMS AND METHODS FOR DIGITAL EVIDENCE PRESERVATION, PRIVACY, AND RECOVERY

(75) Inventor: Robert H. Thibadeau, Pittsburgh, PA (US)

(73) Assignee: Wave Systems Corporation, Cupertino, CA (US)

( * ) Notice: Subject to any disclaimer, the term of this patent is extended or adjusted under 35 U.S.C. 154(b) by 74 days.

(21) Appl. No.: 13/316,027

(22) Filed: Dec. 9, 2011

(65) Prior Publication Data

US 2013/0151862 A1 Jun. 13, 2013

(51) Int. Cl.
  *G06F 21/62* (2013.01)
  *H04L 29/06* (2006.01)
  *G06Q 50/18* (2012.01)

(52) U.S. Cl.
  CPC .............. *G06F 21/62* (2013.01); *G06Q 50/18* (2013.01); *H04L 63/308* (2013.01)
  USPC .............................. 713/189; 726/26; 726/28

(58) Field of Classification Search
  CPC .............................. G06F 21/62; H04L 63/308
  USPC ........... 713/189, 193, 168, 181; 726/9, 26, 28
  See application file for complete search history.

(56) References Cited

U.S. PATENT DOCUMENTS

| | | | |
|---|---|---|---|
| 6,182,222 B1 * | 1/2001 | Oparaji | 726/17 |
| 6,268,789 B1 * | 7/2001 | Diamant et al. | 340/5.74 |
| 7,036,020 B2 * | 4/2006 | Thibadeau | 713/193 |
| 7,426,747 B2 * | 9/2008 | Thibadeau | 726/9 |

OTHER PUBLICATIONS

Rob Lee, "Digital Forensic SIFTing: How to perform a read only mount of filesystem evidence" SANS DFIR, Feb. 19, 2009, pp. 1-6.*
"Searching & Seizing Computers and Obtaining Electronic Evidence in Criminal Investigations", *U.S. Department of Justice (3rd edition 2009)*, available at www.cybercrime.gov/ssmanual, downloaded on Mar. 14, 2012, entire manual.

* cited by examiner

*Primary Examiner* — Samson Lemma
(74) *Attorney, Agent, or Firm* — Baker Botts L.L.P.

(57) ABSTRACT

Systems and methods for preserving digital evidence using a self-protecting storage device are provided, by copying digital evidence from a source drive to a self-protecting storage device, writing and storing metadata relating to the copying such as date, time, and those present, and engaging the self-protecting features of the storage device such that the copied digital evidence cannot be altered.

38 Claims, 5 Drawing Sheets

SYSTEMS AND METHODS FOR DIGITAL EVIDENCE PRESERVATION, PRIVACY, AND RECOVERY

FIELD

This application relates to the preservation of digital evidence, and more particularly to preserving digital evidence with self-protecting storage devices.

BACKGROUND

With the advance of a digital society, the need to protect the integrity and privacy of digital information has grown, particularly in the context of digital evidence preservation. However, searching hard drives and other storage media is limited by law in the United States, and many other countries. Furthermore, the dynamic nature of digital evidence can pose problems for establishing its credibility in court, and rules of evidence such as authentication and hearsay may limit its admissibility altogether.

Authentication of evidence is a threshold test for the admissibility of all evidence, including digital evidence. For example, under the Federal Rules of Evidence, it must be shown that the matter in question is what its proponent claims. In the case of digital evidence, this can be satisfied, for instance, by a law-enforcement agent's testimony that he or she was present when the data was seized. However, even when evidence has been authenticated, its credibility is not assumed, and its proponent must be prepared to defend against attacks on its accuracy and reliability by opponents. The more opportunity for human error or tampering, the less credible a judge or jury may find a particular piece of evidence. See generally Searching & Seizing Computers and Obtaining Electronic Evidence in Criminal Investigations, U.S. Department of Justice (3d ed. 2009), available at www.cybercrime.gov/ssmanual/, the entire contents of which are incorporated by reference herein.

There is therefore a need for digital preservation systems comprising hard drives, flash drives, or other non-volatile storage media or devices (SDs) having a self-protecting mode that can be set once the SD is determined to contain digital evidence, with the ability to recover secured data limited to properly authorized individuals.

One common method of digital evidence preservation is to seize the source drive ($D_0$), removing it from its computer system in the case of a hard drive, and storing it for preservation, without booting the drive or otherwise altering its contents. A copy of $D_0$ ($D_1$) is made, which serves as the source drive for making additional copies for various parties, such as law enforcement, attorneys, custodians, etc. In such cases, personnel involved with the preservation of the data or its copying manually record relevant metadata such as time, date, location, identities of those involved, etc.

Unfortunately, these and similar approaches have problems that raise questions as to the integrity of the digital evidence. If access to the data on the SD is not limited in some way, such as by engaging the self-protecting features to convert the SD to a read-only state, the data is susceptible to spoliation, and whenever the agents involved with securing digital evidence manually record relevant metadata, human error may be introduced. Parties opposed to the introduction of certain digital evidence can rely on these weaknesses to attack its admissibility or credibility. It would therefore be beneficial to provide an evidence preservation system comprising a self-protecting SD that, once triggered, can prevent spoliation of digital evidence, and that has a means of limiting recovery of the digital evidence to authorized individuals.

SUMMARY

Systems and methods for digital evidence preservation, privacy, and recovery are disclosed herein.

In some embodiments, systems for preserving electronic evidence comprise a self-protecting storage device (SPSD) comprising a first computer-readable medium having self-protecting features, and a software medium coupled to the SPSD, the software medium comprising a second computer-readable medium containing a set of instructions for: copying electronic data from a source medium coupled to the SPSD, writing metadata relating to the copying to a secure area on the SPSD, engaging the self-protecting features of the SPSD, whereby the SPSD is converted to a read-only state. In optional embodiments, retrieval of the read-only data on the SPSD is limited to authorized individuals.

In some embodiments, systems for preserving electronic evidence comprise an SPSD, comprising a first computer-readable medium having self-protecting features, and a software medium coupled to the SPSD, the software medium comprising a second computer-readable medium containing a set of instructions for: copying electronic data from a source medium coupled to the SPSD, writing metadata relating to the copying to a secure area on the SPSD, and engaging the self-protecting features of the SPSD.

In some embodiments, methods for preserving electronic evidence comprise copying electronic data to an SPSD from a source medium, wherein the SPSD comprises a first computer-readable medium having self-protecting features, writing metadata relating to the copying to the SPSD, and engaging the self-protecting features of the SPSD, whereby the SPSD.

DETAILED DESCRIPTION

Using the disclosed subject matter, digital evidence is preserved on a self-protecting SD, and recovery of the digital evidence from the self-protecting SD is limited to authorized individuals. This preserves the integrity of the digital evidence, thereby enhancing its admissibility and credibility in court.

The subject matter of the present application relates to self-protecting SDs such as those described in U.S. Pat. Nos. 7,036,020 and 7,426,747 (collectively, the "Thibadeau Patents"), the entire contents of which are incorporated by reference herein. The features described in the Thibadeau Patents are implemented under the TCG Storage WG "Core" standards, with specific examples including, without limitation, "Opal," "Enterprise," and "Optical," (www.trustedcomputinggroup.org), the entire contents of which are incorporated by reference herein.

In some embodiments, the disclosed subject matter uses a self-protecting SD to preserve digital evidence. The entire contents of a source drive are copied to the SD, whereupon certain metadata related to the copying is written to a separate area of the SD. The self-protecting features of the SD are engaged such that the SD is converted to a read-only state.

Figure 1:
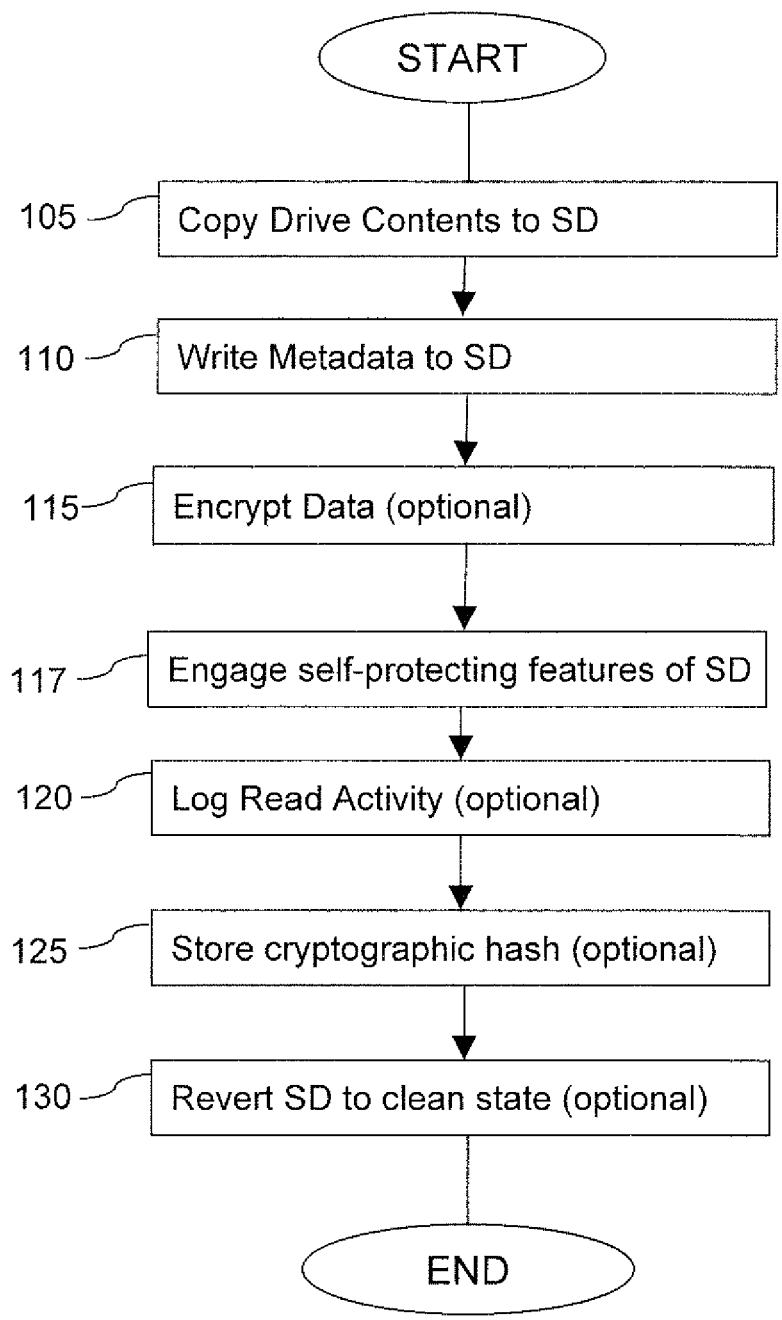
FIG. 1 shows an exemplary procedure for preserving digital evidence according to an exemplary embodiment of the present invention.

FIG. 1 shows a procedure for preserving digital evidence according to an exemplary embodiment of the present invention. The contents of the source drive containing the digital evidence are copied to a self-protecting SD (105). Certain metadata associated with the copying 105 is written to the SD (110). According to certain embodiments, this metadata includes one or more of the following: the identity of the individual(s) performing the preservation procedure, a description of the electronic data being copied, the time and date of the copying, the provenance of the SD, and the location where the copying is performed. The self-protecting features of the SD are then engaged (117). According to certain embodiments, this self-restriction 117 comprises: permanently and irreversibly engaging the self-protecting features to convert the SD to read-only, engaging the self-protecting features to convert the SD to read-only under control of one or more cryptographically strong secrets, engaging the self-protecting features to convert the SD to openly read-only, or engaging the self-protecting features to convert the SD to read-only by one or more authorized users and inaccessible to unauthorized users.

In certain optional embodiments, the metadata is written to a secure area of the SD before the self-protecting features of the SD are engaged. In other embodiments, the metadata is cryptographically signed and a public key credential is attached for added security.

In further optional embodiments, the copied data is encrypted on the SD (115). In an exemplary embodiment, the encrypting is performed using a self-encrypting capability of the SD.

In further optional embodiments, read activity occurring after the self-restricting 117 is logged (120). In an exemplary embodiment, the log is stored in a non-secure area of the SD and is read-only by one or more authorized log users and inaccessible to unauthorized log users. In another exemplary embodiment, the log is cryptographically signed and a public key credential attached. In another exemplary embodiment, the log contains the time and date of the self-restricting 117.

In other optional embodiments, a cryptographic hash of all the copied data is stored on the SD (125). In an exemplary embodiment, the cryptographic hash is stored in a secure area that is not part of the copied data (see FIG. 2). In another exemplary embodiment, the cryptographic hash is cryptographically signed and a public key credential attached.

In other optional embodiments, the SD is revertible to a clean state (130). In an exemplary embodiment, the reverting 130 is performed using a cryptographic erasure and revert. In another exemplary embodiment, the reverting is performed only by one or more authorized reverting users.

Figure 2:
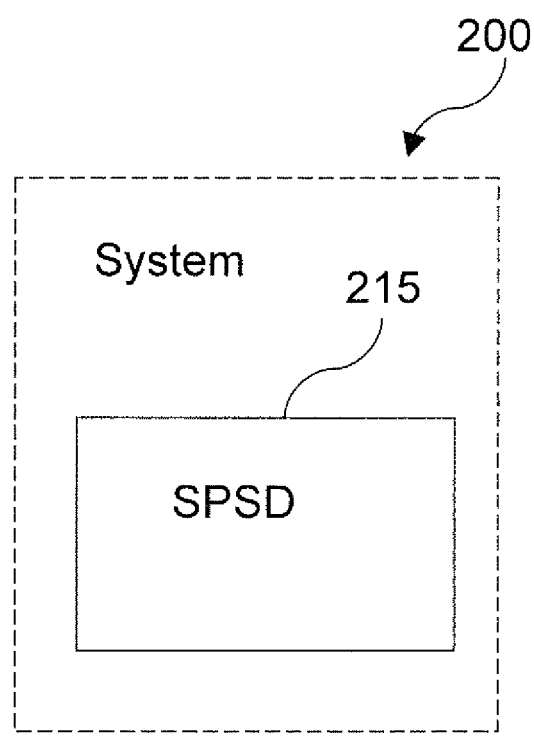
FIG. 2 is a block diagram depicting a digital evidence preservation system in accordance with an exemplary embodiment of the invention.

FIG. 2 is a block diagram of an evidence preservation system 200 in accordance with an exemplary embodiment of the invention. The system 200 includes a self-protecting SD 215 and software for engaging the self-protecting features of the SD.

Figure 3:
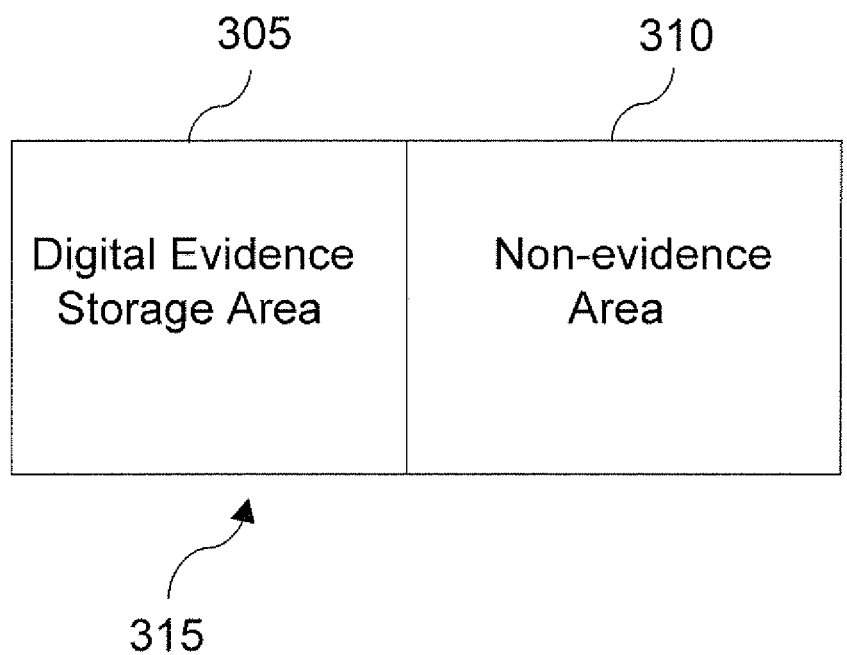
FIG. 3 is a block diagram depicting portions of a self-protecting SD in accordance with an exemplary embodiment of the invention.

FIG. 3 is a block diagram depicting portions of a self-protecting SD 315 in accordance with an exemplary embodiment of the invention. The SD 315 is divided into two main sections: a digital evidence storage area 305 and a non-evidence area 310. The digital evidence storage area 305 stores only digital evidence copied from a source drive. All other data, such as the metadata, access log, etc., are stored in the non-evidence area 310. This ensures the integrity of the digital evidence is maintained, thereby enhancing its credibility and admissibility in court.

Figure 4:
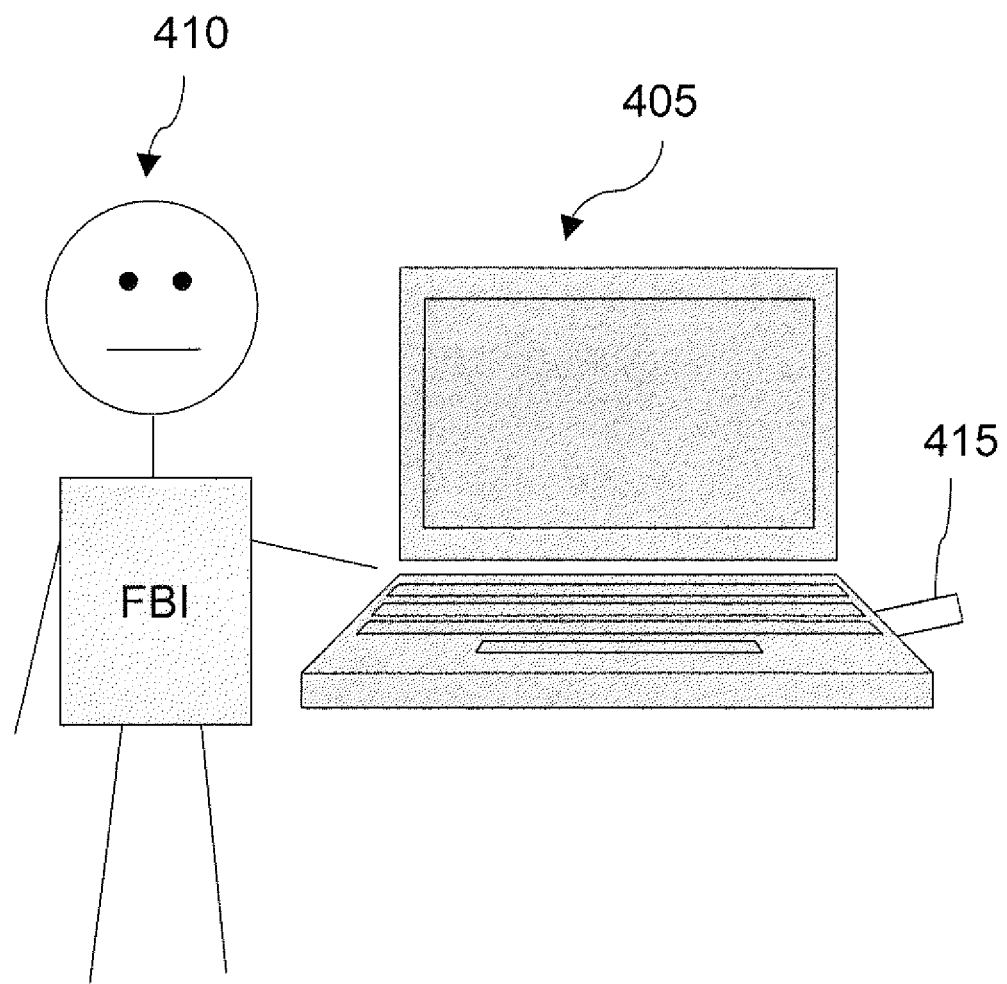
FIG. 4 shows an illustrative use of an exemplary embodiment of the invention by a law-enforcement agent.

FIG. 4 shows an illustrative use of an exemplary embodiment of the invention by a law-enforcement agent. The law-enforcement agent 410 uses the self-protecting SD 415 to copy and preserve digital evidence stored on the source drive of the target device 405. In this particular embodiment, the target device 405 is a laptop computer and the SD 415 is a USB hard drive. In other embodiments, other forms of target devices 405 and SD 415 are used.

Figure 5:
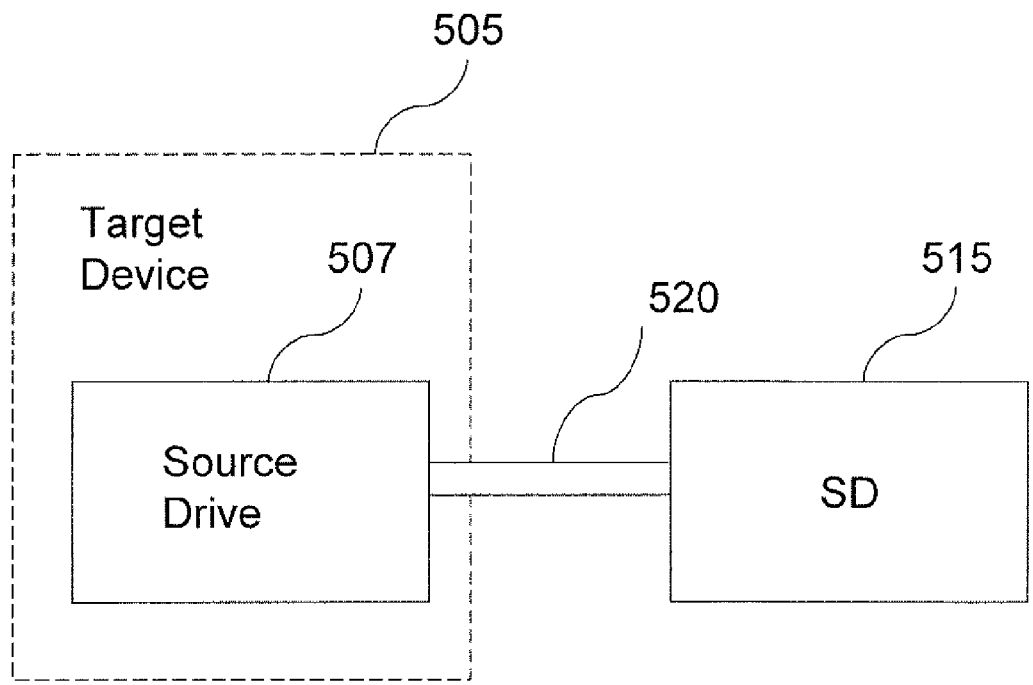
FIG. 5 is a block diagram showing the coupling of an SD to a source drive.

FIG. 5 is a block diagram showing the coupling 520, which couples the SD 515 to the source drive 507. In this particular embodiment, the source drive 507 is physically housed within a target device 505, such as a laptop computer as shown in FIG. 4. The target device 505 is an optional component and is not present in certain optional embodiments. In particular embodiments, the SD 515 is coupled via coupling 520 to the source drive 507 of the target device 505 using USB, IEEE 1394 (FireWire), IEEE 802.3 (Ethernet), SATA, eSATA, SAS (Serial Attached SCSI), Thunderbolt, or wireless protocols. These devices and protocols are listed only as examples, and a person of ordinary skill in the art would understand that any suitable device or protocol for coupling the SD 515 to the source drive 507 could be used.

The foregoing merely illustrates the principles of the invention. Various modifications and alterations to the described embodiments will be apparent to those skilled in the art in view of the teachings herein. For example, although the embodiments discussed herein focus on evidence preservation by law-enforcement agents, it will be apparent to those skilled in the art that embodiments of the disclosed subject matter can also be employed by individuals and companies in response to discovery requests, litigation holds, and other circumstances requiring preservation of digital evidence. It will thus be appreciated that those skilled in the art will be able to devise numerous systems and methods which, although not explicitly shown or described herein, embody the principles of the invention and are thus within the spirit and scope of the invention.

The invention claimed is:

1. A system for preserving electronic evidence, the system comprising:
  a self-protecting storage device (SPSD), comprising a first computer-readable medium having self-protecting features that, when engaged, limit recovery of data stored on the SPSD; and
  a software medium coupled to the SPSD, the software medium comprising a second computer-readable medium containing a set of instructions for:
    copying electronic data from a source medium coupled to the SPSD;
    writing metadata relating to the copying to a secure area on the SPSD, wherein the metadata comprises one or more of the following:
      identity of an individual performing the copying;
      a description of the electronic data;
      time and date of the copying;
      provenance of the SPSD; and
      location where the copying is performed;
    and wherein the metadata is cryptographically signed and a public key credential is attached to the metadata; and
      engaging the self-protecting features of the SPSD, whereby the SPSD is converted to a read-only state.

2. The system of claim 1, wherein the SPSD is coupled to the source medium via a connector including at least one of USB, IEEE 1394, IEEE 802.3, SATA, eSATA, SAS, and Thunderbolt.

3. The system of claim 1, wherein the SPSD comprises a USB hard drive.

4. The system of claim 1, wherein the SPSD is wirelessly coupled to the source medium.

5. The system of claim 1, wherein the metadata is written to the secure area before the self-protecting features are engaged.

6. The system of claim 1, wherein the converting the SPSD to read-only is permanent and unalterable.

7. The system of claim 1, wherein the converting the SPSD to read-only is under control of one or more cryptographically strong secrets.

8. The system of claim 1, wherein the SPSD is converted to an openly read-only state.

9. The system of claim 1, wherein the SPSD is converted to a read-only state such that the data on the SPSD is accessible by one or more authorized users and inaccessible to unauthorized users.

10. The system of claim 1, the system further comprising encrypting the electronic data.

11. The system of claim 10, wherein the encrypting is performed using a self-encrypting capability of the SPSD.

12. The system of claim 1, the system further comprising creating a log of all read activity that occurs after the self-protecting features are engaged.

13. The system of claim 12, wherein the log contains the time and date of the engaging of the self-protecting features.

14. The system of claim 12, wherein the log is stored in a non-secure area of the SPSD, and the log is read-only by one or more authorized log users and inaccessible to unauthorized log users.

15. The system of claim 12, wherein the log is cryptographically signed and a public key credential attached.

16. The system of claim 1, wherein the set of instructions further comprises storing on the SPSD a cryptographic hash of all the electronic data stored on the SPSD.

17. The system of claim 16, wherein the cryptographic hash is stored in a secure area that is not part of the electronic data stored on the SPSD.

18. The system of claim 16, wherein the cryptographic hash is cryptographically signed and a public key credential attached.

19. The system of claim 1, wherein the set of instructions further comprises reverting the SPSD to a clean state.

20. The system of claim 19, wherein the reverting is performed using a cryptographic erasure and revert.

21. The system of claim 19, wherein the reverting is performed only by one or more authorized reverting users.

22. A method for preserving electronic evidence, the method comprising:
copying electronic data to a self-protecting storage device (SPSD) from a source medium, wherein the SPSD comprises a first computer-readable medium having self-protecting features that, when engaged, limit recovery of data stored on the SPSD;
writing metadata relating to the copying to the SPSD, wherein the metadata comprises one or more of the following:
identity of an individual performing the copying;
a description of the electronic data;
time and date of the copying;
provenance of the SPSD; and
location where the copying is performed;
and wherein the metadata is cryptographically signed and a public key credential is attached to the metadata; and
engaging the self-protecting features of the SPSD, whereby the SPSD is converted to a read-only state.

23. The method of claim 22, wherein the SPSD is coupled to the source medium via a connector including at least one of USB, IEEE 1394, IEEE 802.3, SATA, eSATA, SAS, and Thunderbolt.

24. The method of claim 22, wherein the SPSD comprises a USB hard drive.

25. The method of claim 22, wherein the SPSD is wirelessly coupled to the source medium.

26. The method of claim 22, wherein the metadata is written to a secure area on the SPSD.

27. The method of claim 26, wherein the metadata is written to the secure area before the engaging of the self-protecting features.

28. The method of claim 22, wherein the engaging of the self-protecting features comprises converting the SPSD to read-only.

29. The method of claim 28, wherein the converting the SPSD to read-only is permanent and unalterable.

30. The method of claim 28, wherein the converting the SPSD to read-only is under control of one or more cryptographically strong secrets.

31. The method of claim 28, wherein the SPSD is converted to a read-only state such that the data on the SPSD is accessible by one or more authorized users and inaccessible to unauthorized users.

32. The method of claim 22, the method further comprising encrypting the electronic data.

33. The method of claim 32, where the encrypting is performed using a self-encrypting capability of the SPSD.

34. The method of claim 22, the method further comprising creating a log of all read activity that occurs after the self-protecting features are engaged.

35. The method of claim 34, wherein the log is stored in a non-secure area of the SPSD, and the log is read-only by one or more authorized log users and inaccessible to unauthorized log users.

36. The method of claim 22, the method further comprising storing on the SPSD a cryptographic hash of all the electronic data stored on the SPSD.

37. The method of claim 36, wherein the cryptographic hash is stored in a secure area that is not part of the electronic data stored on the SPSD.

38. The method of claim 22, the method further comprising reverting the SPSD to a clean state.

* * * * *